US012696914B1

(12) United States Patent
Coker et al.

(10) Patent No.: US 12,696,914 B1
(45) Date of Patent: Aug. 4, 2026

(54) PHYSIOLOGICAL RESILIENCE-MAINTAINING FORMULATIONS

(71) Applicant: Industria Imperium, LLC, Fairanks, AK (US)

(72) Inventors: Robert Coker, Stevensville, MT (US); Larry Bartlett, Fairbanks, AK (US); Brent Ruby, Missoula, MT (US); Melynda Coker, Stevensville, MT (US)

(73) Assignee: Industria Imperium, LLC, Fairbanks, AK (US)

( * ) Notice: Subject to any disclaimer, the term of this patent is extended or adjusted under 35 U.S.C. 154(b) by 261 days.

(21) Appl. No.: 18/646,507

(22) Filed: Apr. 25, 2024

Related U.S. Application Data

(60) Provisional application No. 63/461,869, filed on Apr. 25, 2023.

(51) Int. Cl.
| | |
|---|---|
| *A23L 33/175* | (2016.01) |
| *A23L 2/52* | (2006.01) |
| *A23L 2/56* | (2006.01) |
| *A23L 2/60* | (2006.01) |
| *A23P 10/40* | (2016.01) |

(52) U.S. Cl.
CPC ...... *A23L 2/52* (2013.01); *A23L 2/56* (2013.01); *A23L 2/60* (2013.01); *A23P 10/40* (2016.08)

(58) Field of Classification Search
CPC ............ A23V 2200/30; A23V 2250/06; A23V 2200/31; A23L 33/40; A23L 33/12; A23L 33/16; A23L 33/175; A23L 33/17; A23L 2/52; A23L 2/385; A23L 2/39; A23P 10/40
USPC ................. 426/801, 800, 71, 74; 514/5.5
See application file for complete search history.

(56) References Cited

U.S. PATENT DOCUMENTS 5,719,133 A * 2/1998 Schmidl ................ A23L 33/115
514/249

OTHER PUBLICATIONS

Army Physical Readiness Training, Field Manual 7-22. Washington, DC: Headquarters, Department of the Army; 2012.

Atherton PJ, Smith K. Muscle protein synthesis in response to nutrition and exercise. J Physiol 2012 590(5); 1049-1057.

Backpacking Food Supplement—Minimus Nutrition (2023). https://minimusnutrition.com/backpacking-food-supplement/ (accessed Apr. 24, 2024).

Beelen M, Burke LM, Gibala M, JC van Loon L. Nutritional strategies to promote postexercise recovery. Int J Sport Nutr Exerc Metab 2010 20(6): 515-532.

Børhsheim E, Kien CL, Pearl WM. Differential effects of dietary intake of palmitic acid and oleic acid on oxygen consumption during and after exercise. Metabolism 2006 55(9): 1215-1221.

Bredt DS. Endogenous nitric oxide synthesis: biological functions and pathophysiology. Free Radic Res 1999 31(6): 577-596.

Breen L, Philp A, Witard OC, Jackman SR, Selby A, Smith K, Baar K, Tipton KD. The influence of a carbohydrate-protein co-ingestion following endurance exercise on myofibrillar and mitochondrial protein synthesis. J Physiol 2011 589 (Pt 16): 4011-4025.

Broome SC, Pham T, Braakhuis AJ, Narang R, Wang HW, Hickey AJR, Mitchell CJ, Merry TL. MitoQ supplementation augments acute exercise-induced increases in muscle PGC1-a mRNA and improves training-induced increases in peak power independent of mitochondrial content and function in untrained middle-aged men. Redox Biol 2022 53: 102341.

Burke LM, Castell LM, Casa DJ, Close GL, Costa RJS, Desbrow, Halson SL, Lis DM, Melin AK, Peeling P, Saunders PU, Slater GJ, Sygo J, Witard OC, Bermon S, Stellingwerff T. International Association of Athletic Federations Consensus Statement 2019: Nutrition for Athletics. 29(2): 73-84.

Burkholder TJ, Mechanotransduction in skeletal muscle. Front Biosci 2008 12: 174-191.

Calder PC. Omega-3 fatty acids and inflammatory processes: from molecules to man. Biochem Soc Trans 2017 45: 1105-1115.

Church DD, Hirsch KR, Park S, Kim IL, Gwin JA, Pasiakos SM, Wolfe RR, Ferrando AA. Essential amino acids and protein synthesis: insights into maximizing the muscle and whole-body response to feeding. Nutrients 2020 12(12): 3717.

Churchward-Venne TA, Breen L, Di Donato DM, Hector AJ, Mitchell CJ, Moore DR, Stellingwerff T, Breuille D, Offord EA, Baker SK, Phillips SM. Leucine supplementation of a low-protein mixed macronutrient beverage enhances myofibrillar protein synthesis in young men: a double-blind, randomized trial. Am J Clin Nutr 2014 99(2): 276-286.

Churchward-Venne TA, Pinckaers PJM, Smeets JSJ, Betz MW, Senden JM, Goessens JPB, Gijsen A, Rollo I, Verdijk LB, van Loon LJC. Dose-response effects of dietary protein on muscle protein synthesis during recovery from endurance exercise in young men: a double-blind randomized trial. Am J Clin Nutr 2020 112(2): 303-317.

(Continued)

*Primary Examiner* — Hong T Yoo
(74) *Attorney, Agent, or Firm* — Rutan & Tucker, LLP; Kyle M. St. James

(57) ABSTRACT

A formulation for maintaining physiological resilience during conditions of sustained physical activity can include a carbohydrate blend, a fatty-acid blend, and an amino-acid blend in a powder form that immediately dissolves in fluid water. The carbohydrate blend can include simple and complex carbohydrates providing less than 70% of total calories of a complete meal in a complete meal-equivalent ("CME") dose of the formulation. The fatty-acid blend can include medium-chain fatty acids, long-chain fatty acids, and very-long-chain fatty acids. The fatty-acid blend can provide less than 50% of the total calories of the complete meal in the CME dose of the formulation. The amino-acid blend can include essential amino acids ("EAAs") and non-essential amino acids. The EAAs can provide 60-80% by weight of the amino-acid blend. The EAAs can provide less than 30% of the total calories of the complete meal in the CME dose of the formulation.

20 Claims, 1 Drawing Sheet

(56) References Cited

OTHER PUBLICATIONS

Cirilli I, Damiani E, Dludla PV, Hargreaves I, Marcheggiani F, Millichap LE, Orlando P, Silvestri S, Tiano L. Role of Coenzyme Q10 in health and disease: an update on the last 10 years (2010-2020). Antioxidants (Basel) 10(8): 1325.

Clegg ME, Golsorkhi M, Henry CJ. Combined medium-chain triglyceride and chilli feeding increases diet-induced thermogenesis in normal-weight humans. Eur J Nutr 52: 1579-1585. (2012).

Coker MS, Ladd K, Murphy CJ, Ruby BC, Shriver TC, Schoeller DA, Newcomer BR, Bateman T, Bartlett L, Coker RH. Alaska backcountry expeditionary hunting promotes rapid improvements in metabolic biomarkers in healthy males and females. Physiol Rep 2020 9(1): e14682.

Coker RH, Coker MS, Bartlett L, Murphy CJ, Priebe K, Shriver TC, Schoeller DA, Ruby BC. The energy requirements and metabolic benefits of wilderness hunting in Alaska. Physiol Rep 2018 6(21): e13925.

Coker RH, Shin K, Scholten K, Johannsen M, Tsigonis J, Kim IY, Schutzler SE, Wolfe RR. Essential amino acid-enriched meal replacement promotes superior net protein balance in older, overweight adults. Clin Nutr. Dec. 2019;38 (6):2821-2826. doi: 10.1016/j.clnu.2018.12.013. Epub Dec. 19, 2018. PMID: 30638738; PMCID: PMC6588419.

Coker, M.S., Schutzler, S.E., Park, S., Williams, R.H., Ferrando, A.A., Deutz, N.E., Wolfe, R.R. and Coker, R.H., 2021. Equivalent servings of free-range reindeer promote greater net protein balance compared to commercial beef. International journal of circumpolar health, 80(1), p. 1897222. (2021).

D'Antona G, Ragni M, Cardile A, Tedesco L, Dossena M, Bruttini F, Caliaro F, Corsetti G, Bottinelli R, Carruba MO, Valerio A, Nisoli E. Branched-chain amino acid supplementation promotes survival and supports cardiac and skeletal muscle mitochondrial biogenesis in middle-aged mice. Cell Metab 12(4); 362-372. (2010).

Devaraj RD, Reddy CK, Xu B. Health promoting effects of konjac glucomannan and its practical applications: A critical review. Int J Biol Macromol 2019 126: 273-281.

Di Donato DM, West DW, Churchward-Venne TA, Breen L, Baker SK, Phillips SM. Influence of aerobic exercise intensity on myofibrillar and mitochondrial protein synthesis in young men during early and late postexercise recovery. Am J Physiol Endocrinol Metab 2014 306 E1025-E1032.

Drobnic F, Lizarraga MaA, Caballero-Garcia A, Cordova A. Coenzyme Q10 supplementation and its impact on exercise and sport performance in humans: a recovery or a performance-enhancing molecule. Nutrients 2022 14(9): 1811.

Earnest CP, Hammar MK, Munsey M, Mikus CR, David RM, Bralley JA, Church TS. Microencapsulated foods as a functional delivery vehicle for omega-3 fatty acids: a pilot study. J Int Soc Sports Nutr 2009 6:12.

Figueroa A, Wong A, Salvador JJ, Gonzales JU. Influence of L-citrulline and watermelon supplementation on vascular function and exercise performance. Curr Opin Clin Metab Care 2017 20(1): 92-98.

Fogleman SA, Janney C, Ciadella-Kam L, Flint JH. Vitamin D deficiency in the military: It's time to act! Mil Med 187 (5-6): 144.(2022).

Fuchs CJ, Gonzalez JT, van Loon LJC. Fructose co-ingestion to increase carbohydrate availability in athletes. J Physiol 2019 597(14): 3549-3560.

Girgis CM, Clifton-Bligh RJ, Hamrick MW, Holick MF, Gunton JE. The roles of vitamin D in skeletal muscle: form, function, and metabolism. Endo Rev 2013 34(1): 33-83.

Gonzalez AM, Trexler ET. Effects of citrulline supplementation on exercise performance in humans: a review of the current literature. J Strength Cond Res 34(5): 1480-1495. (2020).

Gwin JA, Church DD, Wolfe RR, Ferrando AA, Pasiakos SM. Muscle protein synthesis and whole-body protein turnover response to ingesting essential amino acids, intact protein, and protein-containing mixed meals with considerations for energy deficit. Nutrients 2020 12(8): 2457.

Hargreaves M, Spriet LL. Skeletal muscle energy metabolism during exercise. Nat Metab 2020 2(9): 817-828.

Hargreaves MH, Snow R. Amino acids and endurance exercise. Int J Sport Nutr Exerc Metab 2001 11(1): 133-145.

Harty PS, Friedl KE, Nindl BC, Harry JR, Vellers HL, Tinsley GM. Military body composition standards and physical performance: historical perspectives and future directions. J Strength Cond Res. 2022 36(12): 3551-3561.

Hawley JA, Hopkins WG. Aerobic glycolytic and aerobic lipolytic power systems. A new paradigm with implications for endurance and ultraendurance events. Sports Med 1995 19(4): 240-250.

Hawley JA. Nutritional strategies to modulate the adaptive response to endurance training. Nestle Nutr Inst Workshop. 2013 75: 1-14.

Hidalgo-Gutiérrez, González-García P, Díaz-Casado ME, Barriocanal-Casado E, Lópex-Herrador S, Quinzii CM, López, LC. Metabolic targets of coenzyme Q10 in mitochondria. Antioxidants (Basel) 2021 10(4): 520.

Jacobs RA, Lundby C. Mitochondria express enhanced quality as well as quantity in association with aerobic fitness across recreationally active individuals up to elite athletes. J Appl Physiol (2012) 2013 114, 344-350.

Jäger R, Kerksick CM, Campbell BI, Cribb PJ, Wells SD, Skwiat TM, Purpura M, Ziegenfuss, TN, Ferrando AA, Arent SM, Smith-Ryan AE, Stout JR, Arciero PJ, Kreider RB, Willoughby DS, Hoffman JR, Krzykowski JL, Antonio J. International Society of Sports Nutrition Position Stand: protein and exercise. J Int Soc Sports Nutr 2017 14:20.

Johannsen MM, Shin KJ, Priebe K, Coker RH. Alaska Mountain Wilderness Ski Classic: alterations in caloric expenditure and body composition. Wilderness Environ Med 2018 29(2): 221-225.

Kamolrat T, Gray SR. The effect of eicosapentaenoic and docosahexaenoic acid on protein synthesis and breakdown in murine C2C12 myotubes. Biochem Biophys Res Commun 2013 432(4): 593-598.

Karl JP, Margolis LM, Fallowfield JL, Child RB, Martin NM, McClung JP. Military nutrition research: contemporary issues, state of the science and future directions. Eur J Sport Sci 2022 22(1): 87-98.

Karl JP, Margolis LM, Madslien EH, Murphy NE, Castellani JW, Gundersen Y, Hoke AV, Levangie MW, Kumar R, Chakraborty N, Gautam A, Hammamieh R, Martini S, Montain S, Pasiakos SM. Changes in intestinal microbiota composition and metabolism coincide with increased permeability in young adults under prolonged physiological stress. 2017 312(6): G559-G571.

Kårland A, Gómez-Gallego C, Turpeinen AM, Palo-Oja OM, El-Nezami H, Kolehmainen M. Protein supplements and their relation with nutrition, microbiota composition and health: is more protein always better for sportspeople? Nutrients 2019 4: 829.

Kato H, Suzuki K, Bannai M, Moore DR. Protein requirements are elevated in endurance athletes after exercise as determined by the indicator amino acid oxidation method. PLoS 2016 (11)6: e0157406.

Kato HI, Volterman KA, West DWD, Suzuki K, Moore DR. Nutritionally non-essential amino acids are dispensable for whole-body protein synthesis after exercise in endurance athletes with an adequate essential amino acid intake. Amino Acids 2018 50(12): 1679-1684.

Kato, H, Katsuya S, Makoto B, Moore DR, Branched-chain amino acids are the primary limiting amino acids in the diets of endurance-trained men after a bout of prolonged exercise J Nutr 2018 148(6): 925-931.

Kien CL, Bunn JY, Ugrasbul F. Increasing dietary palmitic acid decreases fat oxidation and daily energy expenditure. Am J Clin Nutr 2005 82(2): 320-326.

Lalia AZ, Dasari S, Robinson MM, Abid H, Morse DM, Klaus KA, Lanza IR. Influence of omega-3 fatty acids on skeletal muscle protein metabolism and mitochondrial bioenergetics in older adults. Aging (Albany NY) 2017 9(4): 1096-1129.

Lewis NA, Daniels D, Calder PCC, Castell LM. Are there benefits from the use of fish oil supplements in athletes? A systematic review. Adv Nutr 2020 11(5): 1300-1314.

(56) References Cited

OTHER PUBLICATIONS

Lutz LJ, Gaffney-Stomberg, Karl JP, Hughes JM, Guerriere KI, McClung JP. Dietary intake in relation to miltiary dietary reference values during Army basic combat training; a multi-center, cross-sectional study. Mil Med 2019.

Mach N, Fuster-Botella D. Endurance exercise and gut microbiota: a review. J Sport Health Sci 2017 6:179-197.

Margolis LM, Murphy NE, Martini S, Gundersen Y, Castellani JW, Karl JP, Carrigan CT, Hilde-Kristin T, Madslien E-H, Montain S, Pasiakos SM. Effects of supplemental energy on protein balance during 4-d Arctic military training. Med Sci Sports Exerc 2016 48(8): 1604-1612.

McCarthy JJ, Esser KA. Anabolic and catabolic pathways regulating skeletal muscle mass. Curr Opin Clin Nutr Metab Care 2010 13: 230-235.

McGlory C, Calder PC, Nunes EA. The influence of omega-3 fatty acids on skeletal muscle protein turnover in health, disuse, and disease. Front Nutr 2019 6: 144.

Murphy NE, Carrigan CT, Karl JP, Pasiakos SM, Margolis LM. Threshold of energy deficit and lower-body performance declines in military personnel: a meta-regression. Sports Med 2018 48(9): 2169-2178.

Murray AJ, Knight NS, Cole MA, Cochlin LE, Carter E, Tchabanenko K, Pichulik T, Gulston MK, Atherton HJ, Schroeder MA, Deacon RMJ, Kashiwaya Y, King MT, Pawlosky R, Rawlins JNP, Tyler DJ, Griffin JL, Robertson J, Veech RL, Clarke K. Novel ketone diet enhances physical and cognitive performance. FASEB J 2016 30(12): 4021-4032.

Nindl BC, Leone CD, Tharion WJ, Johnson RF, Castellani JW, Patton JF, Montain SJ. Physical performance responses during 72 h of military operational stress. Med Sci Sports Exerc 2002 34(11); 1814-1822.

O'Brien WJ, Rowlands DS. Fructose-maltodextrin ratio in a carbohydrate-electrolyte solution differentially affects exogenous carbohydrate oxidations rate, gut comfort, and performance. 2011 300(1): G181-189.

Pang BPS, Chan WS, Chan CB. Mitochondria homeostasis and oxidant/antioxidant balance in skeletal muscle—do myokines play a role? Antioxidants (Basel) 10(2): 179. (2021).

Papadopoulou SK, Mantzorou M, Konkyli-Sarika F, Alexandropoulou I, Papathanasiou J, Voulgaridou G, Nikolaidis PT. The key role of nutritional elements on sport rehabilitation and the effects of nutrient intake. Sports 2022 10, 84.

Przewlócka K, Folwarski M, Ka¬zmierczak-Siedlecka, Skonieczan-Zydecka KS, Kaczor JJ. Gut-muscle axis exists and may affect skeletal muscle adaptation to training. Nutrients 2020 12(5): 1451.

Rowlands DS. Houltham SD. Multiple transportable carbohydrate effect on long-distance triathlon performance. Med Sci Sports Exerc 2017 49(8): 1734-1744.

Schalt A, Johannsen MM, Kim J, Chen R, Murphy CJ, Coker MS, Gunga H-C, Coker RH, Steinach M. Negative energy balance does not alter fat-free mass during the Yukon Arctic Ultra—the longest and coldest ultramarathon. Front Physiol 2018 9: 1761.

Schreiner AB, Kao JY, Young VB. The gut microbiome in health and disease. Curr Opin Gastroenterol 2015 31: 69-75.

Sethuraman G, Nizar M, Nadia F, Gregory P, Jahanshiri E, Azam-Ali Sayed N. Nutritional composition of Sacha Inchi (Plukentia Volubilis). Int J Res Sci Innov 2020 7(9): 271-277.

Smith GI, Atherton P, Reeds DN, Mohammed BS, Rankin D, Rennie MJ, Mittendorfer B. Dietary omega-3 fatty acid supplementation increases rate of muscle protein synthesis in older adults: a randomized controlled trial. Am J Clin Nutr 2011 93(2): 402-412.

Smith GI, Atherton P, Reeds DN, Mohammed BS, Rankin D, Rennie MJ, Mittendorfer B. Omega-3 polyunsaturated fatty acids augment the muscle protein anabolic response to hyperaminoacidemia-hyperinsulinemia in healthy young and middle-aged men and women. Clin Sci (Lond) 2011 121(6): 267-278.

Smith GI, Julliand S, Reeds DN, Sinacore DR, Klein S, Mittendorfer B. Fish oil-derived n-3 PUFA therapy increases muscle mass and function in healthy older adults. Am J Clin Nutr 2015 102: 115-122.

Sohail MU, Yassine HM, Sohail A, Thani AA. Impact of physical exercise on gut microbiome, inflammation, and the pathobiology of metabolic disorders. Rev Diabet Stud 2019 15:35-48.

Stroud MA, Ritz P, Coward WA, Sawyer MB, Constatin-Teodosiu, Greenhaff PL, Macdonald IA. Energy expenditure using isotope-labelled water (2H218O), exercise performance, skeletal muscle enzyme activities and plasma biochemical parameters in humans during 95 days of endurance exercise with inadequate energy intake. Eur J Appl Physiol Occup Physiol 1997 76(3): 243-252.

Sunan Wang, Fan Zhub, Yukio Kakuda, Sacha inchi (*Plukenetia volubilis* L.): Nutritional composition, biological activity, and uses. Food Chemistry 265 (2018) 316-328.

Tarpey MD, Roberts JD, Kass LS, Tarpey RJ, Roberts MG. The ingestion of protein with maltodextrin and fructose beverage on substrate utilisation and exercise performance. Appl Physiol Nutr Metab 2013 38(12): 1245-1253.

Tatpati LL, Irving BA, Tom A, Bigelow ML, Klaus K, Short KR, Nair KS. The effect of branched chain amino acids on skeletal muscle mitochondrial function in young and elderly adults. J Clin Endocrinol Metab 2010 95(2): 894-902.

Tiller NB. Robert JD, Beasley L, Chapman S, Pinto JM, Smith L, Wiffin M, Russell M, Sparks SA, Duckworth L, O'Hara J, Sutton L, Antonio J, Willoughby DS, Tarpey MD, Smith-Ryan AE, Ormsbee MJ, Astorino TA, Kreider RB, McGinnis GR, Stout JR, Smith JW, Arent SM, Campbell BI, Bannock L. International Society of Sports Nutrition Position Stand: nutritional considerations for single-stage ultra-marathon training and racing. J Int Soc Sports Nutr 2019 16(1): 50.

Tipton K.D, L.J. C. van Loon, Nutritional Coaching Strategy to Modulate Training Efficiency: 75th Nestlé Nutrition Institute Workshop, Mallorca, Dec. 2011, vol. 75 Nestle Nutrition Institute Workshop Series (accessed Apr. 30, 2024).

Tonkonogi M, Krook A, Walsh B, Sahlin K. Endurance training increases stimulation of uncoupling of skeletal muscle mitochondria in human by non-esterified fatty acids: an uncoupling-protein-mediated effect? Biochem J 2000 351 Pt 3 (Pt 3): 805-810.

Van Wymelbeke V, Himaya A, Louis-Sylvestre J, Fantino M. Influence of medium-chain and long-chain triacylglycerols on the control of food intake in men. Am J Clin Nutr 1998 68: 226-234.

Volek JS, Noakes T, Phinney SD. Rethinking fat as a fuel for endurance exercise. Eur J Sport Sci 2015 15(1): 13-20.

Vyas N, Cialdella-Kam L. Comparison of energy and nutrient intake vs. estimated needs in Warfighters: an update. Curr Nutr Rep 9(4): 405-413. (2020).

Wang Y, Liu Z, Han Y, Xu J, Huang W, Li Z. Medium chain triglycerides enhances exercise endurance through the increased mitochondrial biogenesis and metabolism. PLoS One 2018 13(2): e0191182.

Watanabe S, Tsujino S. Applications of medium-chain triglycerides in foods. Front Nutr 2022 9:802805.

Widmayer P, Kusumakshi S, Hägele FA, Boehm U, Breer H. Expression of the fatty acid receptors GPR84 and GPR120 and cytodifferentiation of epithelial cells in the gastric mucosa of mouse pups in the course of dietary transition. Front Physiol 2017 8: 601.

Wilkinson SB, Phillips SM, Atherton PJ, Patel R, Yarasheski KE, Tarnopolsky MS, Rennie MJ. Differential effects of resistance and endurance exercise in the fed state on signaling molecule phosphorylation and protein synthesis in human muscle. J Physiol 2008 586: 3701-3717.

Williams BD, Wolfe RR, Bracy DP, Wasserman DH. Gut proteolysis contributes essential amino acids during exercise. Am J Physiol 1996 270(1 Pt 1): E85-E90.

Williams MH. Dietary supplements and sports performance: Minerals. J Int Soc Sports Nutr 2005 2-43-49.

* cited by examiner start

_100_

110

Blend any one or more blends including at least the carbohydrate blend, the fatty-acid blend, or the amino-acid blend.

120

Blend the one-or-more blends together with any other ingredients or components of the formulation including excipients such as one or more flavoring agents, one or more sweeteners, or some combination thereof to form the formulation.

130

Portion the formulation into its multidose or single-dose dosage form.

140

Package the formulation, thereby providing a packaged formulation.

finish

PHYSIOLOGICAL RESILIENCE-MAINTAINING FORMULATIONS

PRIORITY

This application claims the benefit of priority to U.S. Provisional Patent Application No. 63/461,869, filed Apr. 25, 2023, which is incorporated by reference in its entirety into this application.

BACKGROUND

Operational scenarios and competitive circumstances exist in which sustained physiological resilience is an over-arching goal despite chronic metabolic stress. For example, a special operator, adventure enthusiast, ultra-endurance athlete, or the like might restrict his or her dietary intake in such operational scenarios or competitive circumstances due to a concern regarding the weight or volume of his or her food kit, thereby creating a challenge with respect to metabolic stress defined by limited access to nutritional provisions.

The market for food products or food product supplements is saturated with high carbohydrate options that often lack a blend of a carbohydrates, essential amino acids, and/or triglycerides and thus failing to fully support a body's needs during sustained physical activity.

Disclosed herein are physiological resilience-maintaining formulations and methods that address the foregoing.

SUMMARY

Disclosed herein is a formulation for maintaining physiological resilience during conditions of sustained physical activity. The formulation includes, in some embodiments, a carbohydrate blend, a fatty-acid blend, and an amino-acid blend. The carbohydrate blend includes simple and complex carbohydrates providing less than 70% of the total calories of a complete meal in a complete meal-equivalent ("CME") dose of the formulation. The fatty-acid blend includes medium-chain fatty acids ("MCFAs"), long-chain fatty acids ("LCFAs"), and very-long-chain fatty acids ("VLCFAs"), optionally as homo- or heterotriglycerides thereof. The fatty-acid blend provides less than 50% of the total calories of a complete meal in the CME dose of the formulation. The amino-acid blend includes essential amino acids ("EAAs") and, optionally, non-essential amino acids ("NEAAs"). The EAAs provide 60-80% by weight of the amino-acid blend. The EAAs provide less than 30% of the total calories of a complete meal in the CME dose of the formulation. The formulation is composed in a powder form such that the CME dose of the formulation immediately dissolves in 5 oz of fluid water, wherein the term "immediately dissolves" refers to at least a threshold percentage of the formulation (e.g., 85%) dissolves in the 5 oz of fluid water within a predetermined timeframe, e.g., within a range of 1-3 seconds or 1-5 seconds.

In some embodiments, the carbohydrate blend includes fructose as a simple carbohydrate. The fructose provides 2-15% of the total calories of a complete meal in the CME dose of the formulation.

In some embodiments, the carbohydrate blend includes maltodextrin as a complex carbohydrate. The maltodextrin provides 5-25% of the total calories of a complete meal in the CME dose of the formulation.

In some embodiments, the fatty-acid blend includes at least a portion of the MCFAs as medium-chain triglycerides ("MCTs"). The MCTs provide 20-25% by weight of the fatty-acid blend.

In some embodiments, the fatty-acid blend includes at least a portion of the LCFAs and VLCFAs as omega-3 fatty acids selected from oleic acid ("OA"), eicosapentaenoic acid ("EPA"), and docosahexaenoic acid ("DHA"). The OA, EPA, and DHA respectively provide 45-55%, 2-10%, and 15-20% by weight of the fatty-acid blend.

In some embodiments, a portion of the EAAs is derived from *Plukenetia volubilis*. The portion of the EAAs from *P. volubilis* provide 10-20% by weight of the amino-acid blend. The portion of the EAAs from *P. volubilis* also provide less than 3% of the total calories of a complete meal in the CME dose of the formulation.

In some embodiments, the EAAs include L-isoleucine providing 5-10% by weight of the formulation; L-lysine providing 15-20% by weight of the formulation; L-methionine providing 3-8% by weight of the formulation; L-phenylalanine providing 4-8% by weight of the formulation; L-valine providing 6-10% by weight of the formulation; L-histidine providing 3-6% by weight of the formulation; L-threonine providing 6-10% by weight of the formulation; L-tryptophan providing up to 3% by weight of the formulation; L-leucine providing 15-20% by weight of the amino-acid blend, or a combination thereof.

In some embodiments, at least the EAAs are instantized.

In some embodiments, the NEAAs include L-alanine, L-arginine, L-aspartate, L-cysteine, cystine, L-glutamate, L-glycine, L-proline, L-serine, L-glutamine, or a combination thereof, the NEAAs providing 5-10% by weight of the amino-acid blend, and the NEAAs providing less than 3% of the total calories of a complete meal in the CME dose of the formulation.

In some embodiments, the amino-acid blend further includes 1-3 g of L-citrulline in the CME dose of the formulation.

In some embodiments, the total calories in the CME dose of the formulation are 670-830 calories.

In some embodiments, the formulation further includes one or more flavoring agents, one or more sweeteners, or some combination thereof. Any of the one-or-more flavoring agents or the one-or-more sweeteners are incorporated into an outer layer of powder particles of the formulation.

Also disclosed herein is a method of using a formulation to maintain physiological resilience during conditions of sustained physical activity. The method includes, in some embodiments, a formulation-obtaining operation, a package-opening operation, a formulation-dispensing operation, and a formulation-dissolving operation. The formulation-obtaining operation includes obtaining a packaged formulation including at least a CME dose of the formulation in a package. The formulation includes, in some embodiments, a carbohydrate blend, a fatty-acid blend, and an amino-acid blend. The carbohydrate blend includes simple and complex carbohydrates providing less than 70% of the total calories of a complete meal in a CME dose of the formulation. The fatty-acid blend includes MCFAs, LCFAs, and VLCFAs, optionally as homo- or heterotriglycerides thereof. The fatty-acid blend provides less than 50% of the total calories of a complete meal in the CME dose of the formulation. The amino-acid blend includes EAAs and, optionally in some embodiments, NEAAs. The EAAs provide 60-80% by weight of the amino-acid blend. The EAAs provide less than 30% of the total calories of a complete meal in the CME dose of the formulation. The package-opening operation includes opening the package of the packaged formulation. The formulation-dispensing operation includes dispensing the CME dose of the formulation into a receptacle, the formulation formulated in a powder form. The formulation-dissolving operation includes immediately dissolving the CME dose of the formulation in 5 oz of fluid water to form an aqueous solution of the formulation. The drinking operation includes drinking the aqueous solution of the formulation.

In some embodiments, the carbohydrate blend includes fructose as a simple carbohydrate. The fructose provides 2-15% of the total calories of a complete meal in the CME dose of the formulation.

In some embodiments, the carbohydrate blend includes maltodextrin as a complex carbohydrate. The maltodextrin provides 5-25% of the total calories of a complete meal in the CME dose of the formulation.

In some embodiments, the fatty-acid blend includes at least a portion of the MCFAs as MCTs. The MCTs provide 20-25% by weight of the fatty-acid blend.

In some embodiments, the fatty-acid blend includes at least a portion of the LCFAs and VLCFAs as omega-3 fatty acids selected from OA, EPA, and DHA.

In some embodiments, the OA, EPA, and DHA respectively provide 45-55%, 2-10%, and 15-20% by weight of the fatty-acid blend.

In some embodiments, a portion of the EAAs include those derived from *Plukenetia volubilis*. The portion of the EAAs from *P. volubilis* provide 10-20% by weight of the amino-acid blend. The portion of the EAAs from *P. volubilis* also provide less than 3% of the total calories of a complete meal in the CME dose of the formulation.

In some embodiments, the EAAs include L-isoleucine providing 5-10% by weight of the formulation; L-lysine providing 15-20% by weight of the formulation; L-methionine providing 3-8% by weight of the formulation; L-phenylalanine providing 4-8% by weight of the formulation; L-valine providing 6-10% by weight of the formulation; L-histidine providing 3-6% by weight of the formulation; L-threonine providing 6-10% by weight of the formulation; L-tryptophan providing up to 3% by weight of the formulation; L-leucine providing 15-20% by weight of the amino-acid blend, or a combination thereof.

In some embodiments, at least the EAAs are instantized.

In some embodiments, the NEAAs include L-alanine, L-arginine, L-aspartate, L-cysteine, cystine, L-glutamate, L-glycine, L-proline, L-serine, L-glutamine, or a combination thereof, the NEAAs providing 5-10% by weight of the amino-acid blend, and the NEAAs providing less than 3% of the total calories of a complete meal in the CME dose of the formulation.

In some embodiments, the amino-acid blend further includes 1-3 g of L-citrulline in the CME dose of the formulation.

In some embodiments, the total calories in the CME dose of the formulation are 670-830 calories.

These and other features of the concepts provided herein will become more apparent to those of skill in the art in view of the accompanying drawings and following description, which describe particular embodiments of such concepts in greater detail.

BRIEF DESCRIPTION OF DRAWINGS

FIG. 1 illustrates a method for making a formulation to maintain physiological resilience during conditions of sustained physical activity in accordance with some embodiments.

DESCRIPTION

Before some particular embodiments are disclosed in greater detail, it should be understood that the particular embodiments disclosed herein do not limit the scope of the concepts provided herein. It should also be understood that a particular embodiment disclosed herein can have features that can be readily separated from the particular embodiment and optionally combined with or substituted for features of any of a number of other embodiments disclosed herein.

Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. In addition, any of the foregoing features or steps can, in turn, further include one or more features or steps unless indicated otherwise. Labels such as "left," "right," "top," "bottom," "front," "back," and the like are used for convenience and are not intended to imply, for example, any particular fixed location, orientation, or direction. Instead, such labels are used to reflect, for example, relative location, orientation, or directions. Singular forms of "a," "an," and "the" include plural references unless the context clearly dictates otherwise.

Unless defined otherwise, all technical and scientific terms used herein have the same meaning as commonly understood by those of ordinary skill in the art.

As set forth above, operational scenarios and competitive circumstances exist in which sustained physiological resilience is an overarching goal despite chronic metabolic stress. For example, a special operator, adventure enthusiast, ultra-endurance athlete, or the like might restrict his or her dietary intake in such operational scenarios or competitive circumstances due to a concern regarding the weight or volume of his or her food kit, thereby creating a challenge with respect to metabolic stress defined by limited access to nutritional provisions.

Embodiments of the disclosure provide a complete blend of macronutrients (fructose/maltodextrin, DHA/EPA, MCTs, Oleic Acid, Sachi Inchi protein and EAAs) and micronutrients, not just EAAs. Disclosed herein are physiological resilience-maintaining formulations and methods that address the foregoing.

Formulations

A formulation for maintaining physiological resilience during conditions of sustained physical activity can include a carbohydrate blend, a fatty-acid blend, and an amino-acid blend, optionally, together with one or more proteins. In addition, the formulation can include one or more coenzymes (e.g., coenzyme $Q_{10}$) or coenzyme analogs (e.g., mitoquinone mesylate), one or more vitamins, one or more minerals, or one or more other supplements such as prebiotics.

The formulation can be formulated in a powder form such that a complete meal-equivalent ("CME") dose of the formulation immediately dissolves in about 5 oz of fluid water or less. Assuming 2500 calories per day for men and 2000 calories per day for women, a complete meal should be 670-830 calories if a person eats three times a day. As such, total calories in the CME dose of the formulation can be 670-830 calories. Further, assuming a complete meal has ⅓ the Percent Daily Value ("% DV") of required nutrients defined by the Food and Drug Administration ("FDA") of the United States, a complete meal should have 33% DV of such nutrients. As such, the CME dose of the formulation can have about 33% DV of the required nutrients.

Carbohydrate Blend

The carbohydrate blend can include simple carbohydrates, complex carbohydrates, or a combination thereof, wherein the simple carbohydrates include monosaccharides and disaccharides, and the complex carbohydrates include polysaccharides. When the carbohydrate blend includes the simple carbohydrates, at least a portion of the simple carbohydrates can be fructose. When the carbohydrate blend includes the complex carbohydrates, at least a portion of the complex carbohydrates can be maltodextrin, konjac glucomannan ("KGM"), or a combination thereof.

The carbohydrate blend can provide less than 80%, 70%, 60%, 50%, or 40% of the total calories of a complete meal in the CME dose of the formulation, a substantial portion of which can be attributed to the complex carbohydrates. Alternatively, the carbohydrate blend can provide more than 40%, 50%, 60%, 70%, or 80% of the total calories of a complete meal in the CME dose of the formulation, a substantial portion of which can be attributed to the complex carbohydrates. When the simple carbohydrates include the fructose, the fructose can provide less than 25%, 15%, 10%, 5%, or 2% of the total calories of a complete meal in the CME dose of the formulation. Alternatively, the fructose can provide more than 2%, 5%, 10%, 15%, or 25% of the total calories of a complete meal in the CME dose of the formulation. When the complex carbohydrates include the maltodextrin, the maltodextrin can provide less than 35%, 25%, 15%, 10%, or 5% of the total calories of a complete meal in the CME dose of the formulation. Alternatively, the maltodextrin can provide more than 5%, 10%, 15%, 25%, or 35% of the total calories of a complete meal in the CME dose of the formulation.

Fatty-Acid Blend

The fatty-acid blend can include medium-chain fatty acids ("MCFAs"), long-chain fatty acids ("LCFAs"), very-long-chain fatty acids ("VLCFAs"), or a combination thereof, wherein the MCFAs have aliphatic backbones of 6-12 carbon atoms, the LCFAs have aliphatic backbones of 13-21 carbon atoms, and the VLCFAs have aliphatic backbones of 22 or more carbon atoms. When the fatty-acid blend includes the LCFAs and VLCFAs, at least a portion of the LCFAs and VLCFAs can be omega-3 fatty acids, which omega-3 fatty acids are selected from at least oleic acid ("OA"), eicosapentaenoic acid ("EPA"), and docosahexaenoic acid ("DHA"), and which omega-3 fatty acids can be is a form of a dispersible powder, the OA optionally sourced as a lipid-dispersible powder from sunflower oil. Further, at least a portion of the MCFAs, LCFAs, or VLCFAs in the fatty-acid blend can be present as homo- or heterotriglycerides, wherein the heterotriglycerides include any combination of the MCFAs, LCFAs, and VLCFAs. For example, when the fatty-acid blend includes the MCFAs, at least a portion of the MCFAs in the fatty-acid blend are medium-chain triglycerides ("MCTs").

The fatty-acid blend can provide less than 60%, 50%, 40%, 30%, 20%, 15%, or 10% of the total calories of a complete meal in the CME dose of the formulation. Alternatively, the fatty-acid blend can provide more than 10%, 15%, 20%, 30%, 40%, 50%, or 60% of the total calories of a complete meal in the CME dose of the formulation. When the fatty-acid blend includes the OA, the OA can provide less than 65%, 55%, 45%, or 35% by weight of the fatty-acid blend. Alternatively, the OA can provide more than 35%, 45%, 55%, or 65% by weight of the fatty-acid blend. When the fatty-acid blend includes the EPA, the EPA can provide less than 20%, 15%, 10%, 5%, or 2% by weight of the fatty-acid blend. Alternatively, the EPA can provide more than 2%, 5%, 10%, 15%, or 20% by weight of the fatty-acid blend. When the fatty-acid blend includes the DHA, the DHA can provide less than 30%, 25%, 20%, 15%, or 10% by weight of the fatty-acid blend. Alternatively, the DHA can provide more than 10%, 15%, 20%, 25%, or 30% by weight of the fatty-acid blend. When the fatty-acid blend includes the MCTs, the MCTs can provide less than 35%, 25%, 20%, 15%, or 10% by weight of the fatty-acid blend. Alternatively, the MCTs can provide more than 10%, 15%, 20%, 25%, or 35% by weight of the fatty-acid blend.

Amino-Acid Blend

The amino-acid blend can include essential amino acids ("EAAs"), non-essential amino acids ("NEAAs"), non-proteinogenic amino acids, or a combination thereof. The EAAs can include L-isoleucine, L-lysine, L-methionine, L-phenylalanine, L-valine, L-histidine, L-threonine, L-tryptophan, L-leucine, or a combination thereof. Notably, at least a portion of the EAAs, NEAAs, and or both can be derived from *Plukenetia volubilis*, which is commonly known as sacha inchi, and from which a vegan, phytoestrogen-free, highly digestible protein powder is preferably sourced from non-genetically modified organism ("GMO") *P. volubilis*. The protein powder can be hydrolyzed to provide the EAAs, NEAAs, or both in the amino-acid blend, or the protein powder can be added in addition to the amino acid-blend or as an alternative to the amino-acid blend. Further, L-leucine plays a notable role in the molecular signaling events and provides a substrate for the stimulation of muscle protein synthesis ("MPS"), especially in the context of mechanical stress. The NEAAs can include L-alanine, L-arginine, L-aspartate, L-cysteine, cystine (i.e., the disulfide dimer of L-cysteine), L-glutamate, L-glycine, L-proline, L-hydroxyproline, L-serine, L-glutamine, or a combination thereof; however, it should be understood that L-arginine, L-cysteine, L-proline, and L-serine can be considered conditionally essential amino acids in some embodiments, particularly with the understanding that sufficient amounts of L-arginine, L-cysteine, L-proline, and L-serine cannot always be produced by a body under metabolic stress. The non-proteinogenic amino acids can include citrulline, ornithine, arginosuccinate, homoserine, cystathionine, or a combination thereof.

Notably, at least a portion of the EAAs, the NEAAs, the non-proteinogenic amino acids, any one or more amino acids of the EAAs, the NEAAs, the non-proteinogenic amino acids, or any combination of the foregoing can be instantized to facilitate dissolution thereof. Further, the EAAs, the NEAAs, the non-proteinogenic amino acids, any one or more amino acids of the EAAs, the NEAAs, the non-proteinogenic amino acids, or any combination of the foregoing can be free in zwitterionic form. That said, EAAs, the NEAAs, the non-proteinogenic amino acids, any one or more amino acids of the EAAs, the NEAAs, the non-proteinogenic amino acids, or any combination of the foregoing can be bound to one or more ions in salt form.

The EAAs can provide less than 90%, 80%, 70%, 60%, or 50% by weight of the amino-acid blend. Alternatively, the EAAs can provide more than 50%, 60%, 70%, 80%, or 90% by weight of the amino-acid blend. As such, the EAAs can be in an amount less than 16 g, 14 g, 12 g, 10 g, 8 g, or 6 g per serving of the formulation. Alternatively, the EAAs can be in an amount more than 6 g, 8 g, 10 g, 12 g, 14 g, or 16 g per serving of the formulation. Further, the EAAs can provide less than 40%, 30%, 20%, 15%, 10%, or 5% of the total calories of a complete meal in the CME dose of the formulation. Alternatively, the EAAs can provide more than 5%, 10%, 15%, 20%, 30%, or 40% of the total calories of a complete meal in the CME dose of the formulation. Notably, the portion of the EAAs from *P. volubilis* can provide less than 30%, 20%, 10%, or 5% by weight of the amino-acid blend. Alternatively, the portion of the EAAs from *P. volubilis* can provide more than 5%, 10%, 20%, or 30% by weight of the amino-acid blend. Further, the portion of the EAAs from *P. volubilis* can provide less than 5%, 4%, 3%, 2%, or 1% of the total calories of a complete meal in the CME dose of the formulation. Alternatively, the portion of the EAAs from *P. volubilis* can provide more than 1%, 2%, 3%, 4%, or 5% of the total calories of a complete meal in the CME dose of the formulation.

As to particular EAAs, the formulation can include L-isoleucine at 1-20% by weight of the formulation, including 1-15% by weight of the formulation, such as 1-10% by weight of the formulation, for example, 5-10% by weight of the formulation; L-lysine at 5-30% by weight of the formulation, including 5-25% by weight of the formulation, such as 10-20% by weight of the formulation, for example, 15-20% by weight of the formulation; L-methionine at 1-15% by weight of the formulation, including 1-10% by weight of the formulation, such as 2-10% by weight of the formulation, for example, 3-8% by weight of the formulation; L-phenylalanine at 1-15% by weight of the formulation, including 1-10% by weight of the formulation, such as 2-10% by weight of the formulation, for example, 4-8% by weight of the formulation; L-valine at 1-15% by weight of the formulation, including 2-10% by weight of the formulation, such as 4-10% by weight of the formulation, for example, 6-10% by weight of the formulation; L-histidine at 1-15% by weight of the formulation, including 1-10% by weight of the formulation, such as 2-8% by weight of the formulation, for example, 3-6% by weight of the formulation; L-threonine at 1-15% by weight of the formulation, including 2-10% by weight of the formulation, such as 4-10% by weight of the formulation, for example, 6-10% by weight of the formulation; L-tryptophan at 1-15% by weight of the formulation, including 1-10% by weight of the formulation, such as 2-8% by weight of the formulation, for example, 3%-5% by weight of the formulation or 3% of the formulation; L-leucine at 5-30% by weight of the amino-acid blend, including 5-25% by weight of the amino-acid blend, such as 10-20% by weight of the amino-acid blend, for example, 15-20% by weight of the amino-acid blend; L-leucine at 5-30% by weight of the EAAs, including 5-25% by weight of the EAAs, such as 10-20% by weight of the EAAs, for example, 15-20% by weight of the EAAs; or a combination thereof.

The NEAAs can provide less than 20%, 15%, 10%, 5%, or 1% by weight of the amino-acid blend. Alternatively, the NEAAs can provide more than 1%, 5%, 10%, 15%, or 20% by weight of the amino-acid blend. Further, the NEAAs can provide less than 10%, 5%, 3%, 2%, or 1% of the total calories of a complete meal in the CME dose of the formulation. Alternatively, the NEAAs can provide more than 1%, 2%, 3%, 5%, or 10% of the total calories of a complete meal in the CME dose of the formulation.

As to the non-proteinogenic amino acids, the amino-acid blend can include less than 5 g of any non-proteinogenic amino acid, including less than 4 g of any non-proteinogenic amino acid, such as less than 3 g of any non-proteinogenic amino acid, for example, less than 1 g of any non-proteinogenic amino acid. Alternatively, the amino-acid blend can include more than 1 g of any non-proteinogenic amino acid, including more than 3 g of any non-proteinogenic amino acid, such as more than 4 g of any non-proteinogenic amino acid, for example, more than 5 g of any non-proteinogenic amino acid. In an example, the amino-acid blend can include less than 5 g of L-citrulline, including less than 4 g of L-citrulline, such as less than 3 g of L-citrulline, for example, less than 1 g of L-citrulline. Alternatively, the amino-acid blend can include more than 1 g of L-citrulline, including more than 3 g of L-citrulline, such as more than 4 g of L-citrulline, for example, more than 5 g of L-citrulline.

Notably, any one or more constituents of the amino acid blend up to an entirety of the amino acid blend can be disposed in a capsule (e.g., a gelatin capsule) and provided separately.

Excipients

The formulation can include any acceptable excipients needed for a multidose or single-dose dosage form suitable for at least enteral administration. The multidose dosage form can be a bulk powder, paste, suspension, emulsion, or solution of the formulation. The single-dose dosage form can be a pre-measured amount of the powder; a pill, tablet, or capsule including effervescent, chewable, and orally disintegrating forms thereof including the powder; a pre-measured amount of the paste; or a pre-measured amount of the suspension, emulsion, or solution. The excipients can include, but are not limited to, antiadherents, binders, coatings, colors, disintegrants, emulsifiers, flavors or flavoring agents, glidants, lubricants, preservatives, sorbents, stabilizers, sweeteners, thickeners, vehicles, or combinations thereof, as needed for the multidose or single-dose dosage form.

The flavoring agents can be incorporated into an outer layer of any particles of the formulation. For example, if the formulation is a powder, the flavoring agents can be incorporated into the outer layer of powder particles of the formulation. Such flavoring agents can include synthetic flavor oils, flavoring aromatics and/or natural oils, extracts from plants, leaves, flowers, fruits, or some combination thereof. By way of non-limiting example, the flavoring agents can include cinnamon oils, oil of wintergreen, peppermint oils, clover oil, hay oil, anise oil, eucalyptus oil, vanilla, citrus oil such as lemon oil, orange oil, or grapefruit oil, grape oil, fruit essences including apple, peach, pear, strawberry, raspberry, cherry, plum, pineapple, or apricot, or some combination of the foregoing flavoring agents.

The sweetener can be selected from glucose (corn syrup), dextrose, fructose, saccharin or its various salts such as the sodium salt of saccharin, dipeptide sweeteners such as aspartame, dihydrochalcone compounds, glycyrrhizin, chloro derivatives of sucrose such as sucralose, and sugar alcohols such as sorbitol, mannitol, xylitol, or the like. Such sweeteners can also be incorporated into the outer layer of the powder particles of the formulation. By way of a non-limiting example, stevia RA480 and trehalose from Gillco Ingredients (San Marcos, CA), particularly, together with whey protein modifier 936.3323U from FONA International (Geneva, IL), successfully mitigates any undesirable tastes and odors commonly associated with branched-chain amino acids. Relatedly, the use of an omega-3 powder derived from a plant source (e.g., NovoOmega® Omega-3 P-50, Novotech Nutraceuticals, Inc., Ventura, CA) eliminates undesirable fishy tastes commonly associated with omega-3 fatty acids from fish sources.

Dosage

With respect to dosage, a single dose of the formulation can include at least about 10 g, 20 g, 30 g, 40 g, 50 g, 60 g, 70 g, 80 g, 90 g, or 100 g, or an intervening amount (e.g., 31 g, 32 g, 33 g, 34 g, of 35 g), of the formulation for an average sized man or woman. Alternatively, a single dose of the formulation can include no more than about 100 g, 90 g, 80 g, 70 g, 60 g, 50 g, 40 g, 30 g, 20 g, or 10 g, or an intervening amount (e.g., 35 g, 34 g, 33 g, 32 g, of 31 g), of the formulation. As such, a single dose of the formulation can include at least about 10 g and no more than about 100 g of the formulation, which includes at least about 20 g and no more than about 70 g of the formulation, such as at least about 30 g and no more than about 40 g of the formulation, for example, at least about 30 g and no more than about 35 g of the formulation.

Methods

Also disclosed herein are methods of making and using the formulation to maintain physiological resilience during conditions of sustained physical activity.

FIG. 1 illustrates a method 100 for making the formulation to maintain physiological resilience during conditions of sustained physical activity in accordance with some embodiments.

As shown by way of an example, the method 100 of making the formulation can include a blending operation 110 of blending any one or more blends including at least the carbohydrate blend, the fatty-acid blend, or the amino-acid blend; a blending operation 120 of blending such blends in the formulation together with any other ingredients or components of the formulation including excipients such as one or more flavoring agents, one or more sweeteners, or some combination thereof; a portioning operation 130 of portioning the formulation into its multidose or single-dose dosage form; and a packaging operation 140 of packaging the formulation, thereby providing a packaged formulation.

In another example, a method of using a formulation effectively maintains physiological resilience during conditions of sustained physical activity, preserves skeletal muscle during conditions of chronic physical stress or nutrient stress, or both. The method can include a formulation-obtaining operation, a package-opening operation, a formulation-dispensing operation, and a formulation-dissolving operation. The formulation-obtaining operation includes obtaining the packaged formulation including at least a complete meal-equivalent ("CME") dose of the formulation in a package. The formulation includes, in some embodiments, a carbohydrate blend, a fatty-acid blend, and an amino-acid blend. The carbohydrate blend includes simple and complex carbohydrates providing less than 70% of total calories of a complete meal in a complete meal-equivalent ("CME") dose of the formulation. The fatty-acid blend includes medium-chain fatty acids ("MCFAs"), long-chain fatty acids ("LCFAs"), and very-long-chain fatty acids ("VLCFAs"), optionally as homo- or heterotriglycerides thereof. The fatty-acid blend provides less than 50% of the total calories of a complete meal in the CME dose of the formulation. The amino-acid blend includes essential amino acids ("EAAs") and, optionally in some embodiments, non-essential amino acids ("NEAAs"). The EAAs provide 60-80% by weight of the amino-acid blend. The EAAs provide less than 30% of the total calories of a complete meal in the CME dose of the formulation. The package-opening operation includes opening the package of the packaged formulation. The formulation-dispensing operation includes dispensing the CME dose of the formulation into a receptacle, the formulation formulated in a powder form. The formulation-dissolving operation includes immediately dissolving the CME dose of the formulation in 5 oz of fluid water to form an aqueous solution of the formulation. The drinking operation includes drinking the aqueous solution of the formulation.

Additional Disclosure

Various formulations and methods for maintaining physiological resilience during conditions of sustained physical activity are set forth above. Notably, such formulations and methods are configured to target operational or competitive scenarios that elicit negative energy balance provoked by relatively constant physical activity, limited dietary intake, or both. Additional aspects of the formulation and methods are set forth below.

The formulations can include a combination of constituents selected from carbohydrates, fatty acids, proteins, EAAs, citrulline, coenzyme $Q_{10}$, KGM, and vitamins and minerals formulated to maintain physiological resilience while significantly reducing the bulk and volume of food kits. Indeed, carbohydrates, fats, proteins, and EAAs positively influence sustained physical activity in a presence of a negative caloric balance or a potential of such a negative caloric balance. In conjunction with an influence of mechanotransduction that activates major signaling cascades germane to muscle remodeling, the formulations synergistically augment these adaptive responses. A 2:1 ratio of maltodextrin:fructose can be used to enhance gut absorption, substrate oxidation, and physical performance. A combination of intact protein in the form of sacha inchi and a unique profile of instantized EAAs can be used to enhance muscle protein remodeling. A comprehensive profile of MCTs and omega-3 fatty acids including OA can maximize the use of fat as a fuel as well as reduce excess inflammation. L-citrulline can enhance blood flow and reduce muscle soreness, coenzyme $Q_{10}$ or mitoquinone mesylate can optimize cellular bioenergetics and reduce inflammation during sustained periods of physical activity, and konjac glucomannan can provide enhanced satiety and gut health.

Such formulations, which can be powdered blends of macronutrients, omega-3 fatty acids, citrulline, coenzyme $Q_{10}$, and a partial or complete profile of vitamins and minerals, can instantly solubilize in 1-10 oz of hot water (e.g., 5 oz of hot water) within 10 seconds (e.g., 5 seconds), thereby providing needed dietary intake on demand with reduced food-kit bulk. That said, the formulations can alternatively be added into a pre-cooked or prepared food as a supplement when needed.

The scenario of negative caloric balance, elicited through strenuous chronic exercise or insufficient carbohydrate and protein intake can result in functional dysregulation due to insufficient muscle remodeling (e.g., rate of muscle protein degradation greater than muscle protein synthesis). Mitigation of functional dysregulation in these circumstances requires a multifaceted approach for which the formulations are formulated. Indeed, the formulations can contain a combination of constituents selected from carbohydrates, fatty acids, proteins, and instantized EAAs uniquely optimized for muscle remodeling during metabolic stress, especially in the context of negative caloric balance. A 2:1 blend of maltodextrin and fructose, which is based on recommendations for carbohydrate ingestion during prolonged exercise, optionally matched with a small portion of plant protein such as that of sacha inchi, can augment muscle glycogen repletion in the circumstance where carbohydrate availability is limited. For example, a strategy that utilizes a 2:1 blend of maltodextrin and fructose overcomes limitations in intestinal glucose absorption, reduces symptoms of gastrointestinal distress, and simultaneously facilitates complete repletion of muscle glycogen compared to any other dietary strategy.

The scenario of negative caloric balance elicited through strenuous chronic exercise or suboptimal fatty acid intake can negatively affect net protein balance limiting operational resilience. Fats are used as a predominant fuel for sustained physical activity. MCTs are demonstrated to mitigate muscle breakdown and optimize muscle protein synthesis. The physiological mechanism responsible for MCT-influenced optimization of protein synthesis or protein breakdown very likely involves the impact of acylated ghrelin levels on the secretion of growth hormone that positively affects the secretion of insulin-like growth hormone (IGF-1). The provision of MCTs is demonstrated to enhance mitochondrial biogenesis, potentially through increased AMP-activated kinase ("AMPK") in pre-clinical models and dietary-induced increase in thermogenesis in humans while promoting satiety. Collectively, dietary intake of MCTs positively augments fat oxidation, potentially sparing limited carbohydrate stores and optimizing muscle remodeling.

The positive influence of DHA and EPA on skeletal muscle is recognized. In pre-clinical studies, acute incubation of fully differentiated C2Cl2 cells with DHA and EPA increased anabolic signaling and protein synthesis in comparison to controls when stimulated by leucine. Sustained provision of DHA and EPA enhances anabolic gene expression, augments mixed muscle, mitochondrial, and sarcoplasmic protein synthesis, increases skeletal muscle mass, and improves physical function in humans, even in older adults with anabolic resistance. While these benefits are already compelling, the provision of DHA and EPA can reduce muscle protein breakdown through beneficial influence of the suppression of chronic inflammation in conditions of metabolic stress. DHA and EPA supplementation also promotes immune function as well as enhances cognition, optimal neuromuscular function, and mitochondrial bioenergetics. Utilization of sacha inchi, optionally in combination with a shelf stable fish oil powder, ensures adequate levels of alpha-linoleic acid, DHA and EPA needed for these physiological benefits.

The distribution of the fatty acids in the formulations is complemented by inclusion of the monounsaturated fatty acid, OA. Previous studies demonstrated the importance of OA in optimization of oxygen consumption during and following aerobic exercise bouts. As a result, increased oleate availability enhances fatty acid oxidation rates during exercise in the fasted and fed states. Further, increased oleate availability augments mitochondrial function, potentially preserving stored liver and muscle glycogen. Collectively, the provision of MCTs, DHA, EPA, and OA improves the utilization of fat, preserves glycogen, and reduces the oxidation of EAA, especially in the circumstance of sustained physical activity, which otherwise relies on increasing utilization of amino acids that may approach 10% of overall total energy expenditure. While this might seem modest, even minor contributions of amino acids to energy expenditure can negatively impact muscle remodeling.

The scenario of negative caloric balance, elicited through sustained physical activity and suboptimal EAA intake can negatively influence muscle protein synthesis. When it comes to the impact of negative energy balance largely elicited by chronic mild to heavy endurance exercise on skeletal muscle metabolism, there is a paucity of information. It is known that mechanotransduction or sustained physical stress alone activates the mechanistic target of rapamycin ("mTOR") and signaling cascades leading to increased rates of protein synthesis dedicated to adaptive muscle remodeling. In the context of sustained physical activity leading to negative energy balance up to two weeks in remote field settings, these adaptive responses have translated to the preservation of fat free mass, preservation of skeletal muscle, or both. When protein intake does not fall below 1.0 gram/kg of body weight/day, negative caloric balance does not exceed 3,500 calories/day, or both, significant reductions in muscle mass or physical performance seem to be largely preserved or even improved.

Recommendations for athletes wanting to build muscle mass and gain weight suggest at least 1.4-2.0 grams of protein with leucine representing at least 35% of the foregoing amount by weight. These recommendations are not specific or appropriate for most military personnel or adventure enthusiasts where an interactive combination of endurance, strength, and flexibility is required. For Special Operations personnel, endurance capacity emerges as the primary factor required for timed runs, ruck marches, obstacle courses, and timed land navigation. Events which demand physiological resilience over multiple consecutive days (e.g., ultraendurance, expeditions, adventure racing, and hunter-gatherer activities) are heavily reliant on aerobic fitness, which is supported by training-induced improvements in mitochondrial biogenesis, content, and function also characterized as muscle remodeling.

Under these circumstances, gut derived amino acids are released during endurance exercise minimizing muscle catabolismoupled with the influence of mechanotransduction or translating mechanical stimuli (e.g., endurance exercise) to molecular modifications that promote mitochondrial protein synthesis in muscle, the availability of gut derived amino acids may lessen the overall exogenous demand for amino acids. Endurance exercise, especially sustained over several hours to days, likely place a premium on the sustained availability of EAAs through endogenous and exogenous sources to support mitochondrial biogenesis.

Whereas intact protein is recommended to augment muscle protein synthesis devoted to mitochondrial biogenesis in response to endurance exercise, EAAs are much more potent by weight in this regard. Compared to intact protein, increased peripheral availability of EAAs via enhanced digestibility seems to drive the beneficial enhancements in muscle protein synthesis when compared to the dietary ingestion of intact protein. The correct proportion of EAAs during metabolic stress also reduces the digestive workload in comparison to the ingestion of intact protein, which elevates the provision of dispensable NEAAs. The availability of EAAs is important since endurance exercise increases the oxidation of branched chain amino acids and upregulates gluconeogenic metabolism. This increase in amino acid demand potentially limits the availability of EAAs for muscle remodeling. The threshold of negative energy balance closely associated with reductions in performance is very likely linked to exaggerated demand for amino acids as a substrate for the generation of adenosine triphosphate. The provision of EAAs results in 2.5-fold greater improvements in muscle remodeling. Therefore, the EAAs as provided in the formulation represents a more efficient strategy for nutrient driven muscle remodeling. Such a provision of individual EAAs becomes increasingly important as the level of negative caloric balance increases.

The profile of instantized EAAs is formulated to complement the amino acid profile of the plant protein, sacha inchi, for utilization during sustained endurance exercise. While sacha inchi contains a well-balanced and highly digestible profile of amino acids for a plant protein, the amount of lysine compared to animal proteins is somewhat lower, so the amount of lysine in the amino-acid blend is increased. In addition, citrulline can be a portion of the formulations, being that citrulline is an important precursor to the generation of nitric oxide, which has been demonstrated to enhance blood flow and oxygenation to skeletal muscle. The physiological response to citrulline improves exercise performance and further enhances the availability of EAAs needed for optimal muscle remodeling. EAAs promote the mitochondrial protein synthesis required for chronic physical activity by leveraging the complementary amino acid profiles of sacha inchi. The EAAs and sacha inchi, together, leverages the beneficial influence of the maltodextrin, fructose, and the fatty-acid blend to augment mitochondrial protein synthesis, which is important for effective muscle remodeling during sustained endurance exercise.

The scenario of negative caloric balance, elicited through chronic exercise and suboptimal nutrient intake can negatively influence muscle protein synthesis. Operating within the electron transport chain at the mitochondrial level, coenzyme $Q_{10}$ plays a crucial role in the generation of ATP. Recent evidence suggests the importance of coenzyme $Q_{10}$ on enhancing the stability of muscle cell membranes. Supplementation of mitoquinone mesylate promotes enhancements in skeletal muscle via peroxisome proliferator-activated receptor gamma coactivator 1-alpha (PGC1-$\alpha$), translating to a 50% increase in peak power. In addition to improvements in cellular bioenergetics, coenzyme $Q_{10}$ can offer antioxidant and anti-inflammatory benefits, especially in the context of over-training or repetitive sustained exercise that are characterized by pro-inflammatory signaling, muscle soreness, impaired muscle function, and leakage of muscle proteins into the circulation. If left unaddressed, ultrastructural muscle damage presents with muscle membrane damage, sarcomere derangements, and chronic inflammation that lead to accelerated autophagy and protein breakdown. Under these circumstances coenzyme $Q_{10}$ may mitigate these undesirable physiological perturbations, primarily due to its antioxidant function and role as a cofactor in the maintenance of mitochondrial function. These beneficial roles dovetail nicely with the influence of EAAs on mitochondrial synthesis in skeletal muscle and provide a solid rationale for the provision of coenzyme $Q_{10}$ to enhance exercise performance.

The scenario of negative caloric balance, elicited through chronic exercise and suboptimal nutrient intake can negate adaptive physiological responses due to a disruption in gastrointestinal homeostasis. Composition of the gut microbiota affects nutritional status, metabolic regulation, and immune system function. While numerous studies support the role of moderate physical activity on gut health, chronic levels of demanding physical activity can lead to perturbations in the homeostasis of gut microbiota. This can lead to increased inflammation and impaired nutrient availability that upsets the crucial balance between muscle protein synthesis and breakdown, resulting in impairments in muscle function. For example, relatively recent studies conducted in Norwegian Army soldiers demonstrated that circumstances complicated by multiple stressors (e.g., sustained activity, negative caloric balance, and rapid weight loss) exacerbated disruptions in intestinal microbiota composition and increased inflammation, potentially contributing to losses in whole body protein.

The rationale behind the use of reduced amounts of EAAs compared to high intake of intact protein is supported by the undesirable influence of excessive protein intake on undigested protein residues in the colon. More specifically, excessive protein intake may have a detrimental impact on the intestine as well as metabolic, immunological, and neurological function due to the accumulation of fermentation by-products from excess protein, including ammonia, biogenic amines, indole compounds, and phenols. On the other hand, KGM derived from a perennial plant of the genus Amorphophallus has numerous physiological benefits, including pre-biotic and anti-inflammatory actions that are of specific relevance to the formulations provided herein. Acting as a pre-biotic to ensure maintenance of gut health, KGM acts with other constituents of the formulations to optimize muscle remodeling despite the challenges of chronic physical stress.

The scenario of negative caloric balance elicited through chronic exercise and insufficient vitamin and mineral intake may negatively influence exercise performance. Vitamin D plays a substantial role in the maintenance of skeletal muscle strength and function. Unfortunately, vitamin D deficiency is underdiagnosed in warfighters and has been linked to increased risks of musculoskeletal injury, training attrition, and need for healthcare interventions. Deficiencies in calcium, iron, B-vitamins, and fiber have also been identified in warfighters, which can be further exacerbated by physical and environmental stress. Minerals such as manganese, copper, zinc, iron, and selenium are vital co-factors of antioxidant enzymes, serve to inactivate reactive oxygen species, and repair damage from training-induced oxidative damage. They are also crucial to the regulation of muscle contraction and oxidative metabolism, especially in the context of sustained physical activity. These vitamin and mineral deficiencies present themselves in recreational athletes and adventure enthusiasts, causing problems related to performance, injury prevention, or adaptive responses to recovery from strenuous exercise. Therefore, a select or complete panel of vitamins and minerals in the formulations not only serves to optimize muscle function, but such a panel of vitamins and minerals also preserves the regulation of physiological processes that might be exceptionally challenged by sustained physical activity or negative energy balance.

The beneficial influence of EAAs on muscle protein synthesis in conjunction with resistance exercise has been demonstrated in numerous clinical research studies. In fact, there is a large amount of investigation in this area when compared to the interactive relationships between EAAs, muscle protein synthesis, and endurance exercise. On the other hand, the formulations and methods leverage interactive benefits of the carbohydrate blend including any maltodextrin or fructose thereof, the fatty-acid blend including any DHA, EPA, MCTs, or OA thereof, the EAAs, sacha inchi, citrulline, coenzyme $Q_{10}$, KGM, and the partial or complete profile of vitamins and minerals for specific use during chronic, sustained exercise that may be co-mingled with periods of negative caloric balance. Indeed, some embodiments of the formulations ensure the optimal delivery of instantized EAAs via the provision of citrulline leveraged by complimentary provision of sacha inchi to provide additional essential and NEAAs. The anabolic actions of these constituents are further supported by the physiological benefits of the fatty-acid blend (e.g., DHA, EPA, any MCTs, OA, etc.) that dampens chronic inflammation and enhances mitochondrial bioenergetics. KGM also ensures microbial diversity in the gut, and the partial or complete profile of vitamins and minerals eliminates concerns about potential deficiencies in that regard. The interactive anabolic influence of these collective constituents supersedes and supplants any other nutritional products that only utilize variations in EAAs for applications that are either focused on clinical population or muscle hypertrophy or absolute strength, and not specific to chronic and sustained endurance exercise and negative caloric balance.

The EAAs of the formulations can be produced by fermentation, in which microorganisms synthesize one or more amino acids that are later isolated. The EAAs can additionally or alternatively be produced by hydrolysis, in which proteins are degraded and the constituent amino acids thereof isolated. The EAAs may also be enzymatically or chemically synthesized. Further, the EAAs may be modified or derivatized, for example with acetyl or hydroxyl groups, to improve solubility or other properties. It is recognized that the EAAs can be produced by any method known to those skilled in the art. In general, the EAAs are of food-grade quality or pharmaceutical-grade quality. Each of the EAAs of the formulations may be in a free form, a salt form, complexed with a metal ion, combination thereof or any other form.

The formulations can be blends of individual amino acids, in the relative proportions detailed above. Alternatively, the amino-acid blend can be formulated to mask the unpalatability of some of the free amino acids.

The NEAAs for elevated protein synthesis can be derived, at least in part, from intact protein found in the formulation. The NEAAs are important in some embodiments because the absence of NEAAs can become rate limiting for adequate MPS in the context of sustained exercise or negative caloric balance.

The vitamins and minerals can be the essential substances needed for the maintenance of physiological function as outlined by the Dietary Guidelines for Americans. The formulations can include a partial or complete panel of vitamins and minerals. The vitamins can be fat-soluble and water-soluble vitamins. Such vitamins can include, but are not limited to, vitamin C (~100-200 mg/serving), vitamin A (300-350 mcg/serving), vitamin E (8-10 mg/serving), vitamin B12 (1-2 mg/serving), vitamin K (70-80 mcg/serving), riboflavin (0.8-1.0 mg/serving), niacin (10-15 mg/serving), vitamin D (10-15 mcg/serving), vitamin B6 (1.0-1.5 mg/serving), folic acid (250-300 mcg/serving), thiamine (0.8-1.2 mg/serving), biotin (15-30 mg), and pantothenic acid (2-4 mg/serving). The vitamins can include, but are not limited to, salts, derivatives, and metabolites thereof as well as compounds having the same or similar activity of a vitamin. The minerals can include, but are not limited to, calcium (80-120 mg/serving), iron (0.5-1.0 mg/serving), phosphorus (60-80 mg/serving), iodine (80-90 mcg/serving), magnesium (30-60 mg/serving), zinc (4-8 mg/serving), selenium (30-40 mcg/serving), copper (0.4-0.8 mg/serving), manganese (1.0-1.5 mg/serving), chromium (20-30 mcg/serving), molybdenum (30-40 mcg/serving), chloride (400-600 mg/serving), sodium (400-600 mg/serving), potassium (300-500 mg/serving).

The formulations work to increase MPS and sustain physiological resilience under conditions of sustained physical or nutrient stress by way of balanced carbohydrates, the fatty-acid blend, optionally instantized EAAs, and intact vegetable protein from sacha inchi or any other representative intact protein, thereby maintaining musculoskeletal health and physiological resilience in the presence of sustained physical or nutrient stress. The formulations can also include one or more excipients, non-limiting examples of which include a buffering agent, a preservative, a stabilizer, a binder, a compaction agent, a lubricant, a dispersion enhancer, a disintegration agent, a flavoring agent, a sweetener, a coloring agent, and combinations of any of these agents.

Advantageously, the formulation set forth herein for maintaining physiological resilience during conditions of sustained physical activity includes optimal ratios of particular fatty acids and amino acids. Again, the fatty-acid blend can include MCFAs, LCFAs, and VLCFAs. The fatty-acid blend contributes directly to muscle remodeling by providing energy for and facilitating transport of amino acids into muscle cells. Fatty acids, particularly omega-3 fatty acids, have been shown to influence gene expression related to muscle metabolism and protein synthesis, modulating various signaling pathways involved in muscle protein synthesis and even in muscle breakdown. By affecting gene expression, the fatty acids in the formulation can indirectly influence muscle remodeling processes. In addition to involvement in the transport of the amino acids, fatty acids influence transport of other vitamins and nutrients in the formulation across cell membranes. Additionally, the fatty acids facilitate the uptake of the carbohydrates in the formulation, providing another fuel source for muscle recovery. The omega-3 fatty acids also provide a more conducive environment for muscle remodeling through reducing inflammation which can disrupt cellular signaling pathways, particularly following exercise-induced damage.

As to the amino-acid blend, it can include the EAAs with higher concentrations of L-leucine, which contributes to the molecular signaling for muscle synthesis. During intense exercise, L-leucine helps in the repair and recovery process of the resulting stress and damages by triggering the synthesis of new proteins necessary for rebuilding muscle fibers, restoring muscle function, and preserving muscle mass and function. The NEAAs, which can be conditionally essential, can be provided through the provision of a plant-based intact protein, sachi inchi, as above.

While the optimal ratios of these particular fatty acids and amino acids within the formulation can increase muscle protein synthesis, they can also diminish protein breakdown by ~50% compared to other intact proteins with inferior fatty-acid and amino-acid profiles. This suppression of protein breakdown allows the net protein balance to remain higher after consumption of the formulation, therefore influencing the availability of the essential amino acids necessary for muscle remodeling and growth.

While some particular embodiments have been disclosed herein, and while the particular embodiments have been disclosed in some detail, it is not the intention for the particular embodiments to limit the scope of the concepts provided herein. Additional adaptations or modifications can appear to those of ordinary skill in the art, and, in broader aspects, these adaptations or modifications are encompassed as well. Accordingly, departures may be made from the particular embodiments disclosed herein without departing from the scope of the concepts provided herein.

What is claimed is:

1. A formulation for maintaining physiological resilience during conditions of sustained physical activity, comprising:

a carbohydrate blend of simple and complex carbohydrates providing less than 70% of total calories of a complete meal in a complete meal-equivalent ("CME") dose of the formulation;

a fatty-acid blend of medium-chain fatty acids ("MCFAs"), long-chain fatty acids ("LCFAs"), and very-long-chain fatty acids ("VLCFAs"), optionally including homo- or heterotriglycerides thereof, the fatty-acid blend providing less than 50% of the total calories of the complete meal in the CME dose of the formulation; and an amino-acid blend of essential amino acids ("EAAs"), the EAAs providing 60-80% by weight of the amino-acid blend, and the EAAs providing less than 30% of the total calories of the complete meal in the CME dose of the formulation, the formulation formulated in a powder form such that the CME dose of the formulation dissolves in 5 oz of fluid water.

2. The formulation of claim 1, wherein the carbohydrate blend includes fructose as a simple carbohydrate, the fructose providing 2-15% of the total calories of the complete meal in the CME dose of the formulation.

3. The formulation of claim 1, wherein the carbohydrate blend includes maltodextrin as a complex carbohydrate, the maltodextrin providing 5-25% of the total calories of the complete meal in the CME dose of the formulation.

4. The formulation of claim 1, wherein the fatty-acid blend includes at least a portion of the MCFAs as medium-chain triglycerides ("MCTs"), the MCTs providing 20-25% by weight of the fatty-acid blend.

5. The formulation of claim 1, wherein the fatty-acid blend includes at least a portion of the LCFAs and VLCFAs as omega-3 fatty acids selected from oleic acid ("OA"), eicosapentaenoic acid ("EPA"), and docosahexaenoic acid ("DHA"), the OA, EPA, and DHA respectively providing 45-55%, 2-10%, and 15-20% by weight of the fatty-acid blend.

6. The formulation of claim 1, wherein a portion of the EAAs is derived from *Plukenetia volubilis*, the portion of the EAAs from *P. volubilis* providing 10-20% by weight of the amino-acid blend, and the portion of the EAAs from *P. volubilis* providing less than 3% of the total calories of the complete meal in the CME dose of the formulation.

7. The formulation of claim 1, wherein the EAAs include L-isoleucine providing 5-10% by weight of the formulation; L-lysine providing 15-20% by weight of the formulation; L-methionine providing 3-8% by weight of the formulation; L-phenylalanine providing 4-8% by weight of the formulation; L-valine providing 6-10% by weight of the formulation; L-histidine providing 3-6% by weight of the formulation; L-threonine providing 6-10% by weight of the formulation; L-tryptophan providing up to 3% by weight of the formulation; L-leucine providing 15-20% by weight of the amino-acid blend, or a combination thereof.

8. The formulation of claim 1, wherein at least the EAAs are instantized.

9. The formulation of claim 1, wherein the amino-acid blend includes non-essential amino acids ("NEAAs"), the NEAAs including L-alanine, L-arginine, L-aspartate, L-cysteine, cystine, L-glutamate, L-glycine, L-proline, L-serine, L-glutamine, or a combination thereof, the NEAAs providing 5-10% by weight of the amino-acid blend, and the NEAAs providing less than 3% of the total calories of the complete meal in the CME dose of the formulation.

10. The formulation of claim 1, wherein the amino-acid blend further includes 1-3 g of L-citrulline in the CME dose of the formulation.

11. The formulation of claim 1, wherein the total calories of the complete meal in the CME dose of the formulation are 670-830 calories.

12. The formulation of claim 1, further comprising one or more flavoring agents, one or more sweeteners, or some combination thereof, any of the one-or-more flavoring agents or the one-or-more sweeteners incorporated into an outer layer of powder particles of the formulation.

13. A method of using a formulation to maintain physiological resilience during conditions of sustained physical activity, comprising:

obtaining a packaged formulation including at least a complete meal-equivalent ("CME") dose of the formulation in a package, the formulation including:

a carbohydrate blend of simple and complex carbohydrates providing less than 70% of total calories of a complete meal in a complete meal-equivalent ("CME") dose of the formulation;

a fatty-acid blend of medium-chain fatty acids ("MCFAs"), long-chain fatty acids ("LCFAs"), and very-long-chain fatty acids ("VLCFAs"), optionally including homo- or heterotriglycerides thereof, the fatty-acid blend providing less than 50% of the total calories of the complete meal in the CME dose of the formulation; and an amino-acid blend of essential amino acids ("EAAs"), the EAAs providing 60-80% by weight of the amino-acid blend, and the EAAs providing less than 30% of the total calories of the complete meal in the CME dose of the formulation;

opening the package of the packaged formulation;

dispensing the CME dose of the formulation into a receptacle, the formulation formulated in a powder form;

dissolving the CME dose of the formulation in 5 oz of fluid water to form an aqueous solution of the formulation; and consuming the aqueous solution of the formulation.

14. The method of claim 13, wherein the carbohydrate blend includes fructose as a simple carbohydrate, the fructose providing 2-15% of the total calories of the complete meal in the CME dose of the formulation.

15. The method of claim 13, wherein the carbohydrate blend includes maltodextrin as a complex carbohydrate, the maltodextrin providing 5-25% of the total calories of the complete meal in the CME dose of the formulation.

16. The method of claim 13, wherein the fatty-acid blend includes at least a portion of the MCFAs as medium-chain triglycerides ("MCTs"), the MCTs providing 20-25% by weight of the fatty-acid blend.

17. The method of claim 13, wherein the fatty-acid blend includes at least a portion of the LCFAs and VLCFAs as omega-3 fatty acids selected from oleic acid ("OA"), eicosapentaenoic acid ("EPA"), and docosahexaenoic acid ("DHA").

18. The method of claim 17, wherein the OA, EPA, and DHA respectively provide 45-55%, 2-10%, and 15-20% by weight of the fatty-acid blend.

19. The method of claim 13, wherein a portion of the EAAs is derived from *Plukenetia volubilis*, the portion of the EAAs from *P. volubilis* providing 10-20% by weight of the amino-acid blend, and the portion of the EAAs from *P. volubilis* providing less than 3% of the total calories of the complete meal in the CME dose of the formulation.

20. The method of claim 13, wherein the EAAs include L-isoleucine providing 5-10% by weight of the formulation; L-lysine providing 15-20% by weight of the formulation; L-methionine providing 3-8% by weight of the formulation; L-phenylalanine providing 4-8% by weight of the formulation; L-valine providing 6-10% by weight of the formulation; L-histidine providing 3-6% by weight of the formulation; L-threonine providing 6-10% by weight of the formulation; L-tryptophan providing up to 3% by weight of the formulation; L-leucine providing 15-20% by weight of the amino-acid blend, or a combination thereof.

\* \* \* \* \*